(12) United States Patent
Karr (10) Patent No.: US 6,572,322 B2
(45) Date of Patent: Jun. 3, 2003

(54) MOUNTING SYSTEM FOR TRUCK MOUNTED BEVERAGE HANDLER

(75) Inventor: Harry Karr, Wataula, TX (US)

(73) Assignee: Cargotec, Inc., Swanton, OH (US)

( * ) Notice: Subject to any disclaimer, the term of this patent is extended or adjusted under 35 U.S.C. 154(b) by 0 days.

(21) Appl. No.: 10/002,581

(22) Filed: Nov. 15, 2001

(65) Prior Publication Data

US 2002/0057959 A1 May 16, 2002

Related U.S. Application Data

(60) Provisional application No. 60/249,013, filed on Nov. 15, 2000.

(51) Int. Cl.⁷ .................................................. B66F 9/06
(52) U.S. Cl. ....................................... 414/462; 414/467
(58) Field of Search ......................................... 414/462

(56) References Cited

U.S. PATENT DOCUMENTS

| | | | | |
|---|---|---|---|---|
| 3,390,797 A | * | 7/1968 | Goodacre et al. ............ | 414/462 |
| 3,407,950 A | | 10/1968 | Ward ........................... | 214/512 |
| 3,785,517 A | | 1/1974 | Brajkovich ................... | 214/450 |
| 3,799,379 A | | 3/1974 | Grether et al. ............... | 214/515 |
| 4,061,237 A | | 12/1977 | Austin et al. ................ | 214/515 |
| 4,180,363 A | | 12/1979 | Steiger et al. ............... | 414/347 |
| 4,266,795 A | | 5/1981 | Walker ........................ | 280/402 |
| 4,365,921 A | | 12/1982 | Brouwer et al. ............. | 414/347 |
| 4,396,341 A | | 8/1983 | Brouwer et al. ............. | 414/467 |
| 4,460,064 A | | 7/1984 | Lutz et al. ................... | 187/9 R |
| 4,838,753 A | | 6/1989 | Gehman et al. ............. | 414/563 |
| 4,921,075 A | | 5/1990 | Schumacher et al. ....... | 187/9 E |
| 5,174,415 A | | 12/1992 | Neagle et al. ............... | 187/9 R |
| 5,538,386 A | | 7/1996 | Scheibel ...................... | 414/467 |
| 5,549,437 A | * | 8/1996 | Kishi .......................... | 414/462 |
| 5,575,604 A | | 11/1996 | Dubosh et al. .............. | 414/462 |
| 5,651,658 A | | 7/1997 | Holmes et al. .............. | 414/635 |
| 5,749,695 A | | 5/1998 | Moffett et al. ............... | 414/467 |
| 5,813,820 A | * | 9/1998 | Dubosh et al. .............. | 414/462 |
| 5,890,866 A | | 4/1999 | Scheibel ...................... | 414/467 |
| 6,024,535 A | * | 2/2000 | Dubosh et al. .............. | 414/462 |
| 6,062,800 A | * | 5/2000 | Perry et al. .................. | 414/462 |

FOREIGN PATENT DOCUMENTS

| | | | | |
|---|---|---|---|---|
| GB | 2 259 292 A | | 10/1993 | ............. B66F/9/10 |
| JP | 52002948 A | * | 1/1977 | ................. 414/462 |
| JP | 7-291592 | | 11/1995 | ............. B66F/6/24 |

* cited by examiner

Primary Examiner—Kathy Matecki
Assistant Examiner—Sang Kim
(74) Attorney, Agent, or Firm—Gifford, Krass, Groh, Sprinkle, Anderson & Citkowski, P.C.

(57) ABSTRACT

A mounting system is designed for a truck-mounted beverage handler of the type having a body and a pair of fork tines that are movable with respect to the body and mounted generally to the front of the body. The beverage handler also has a pair of front wheels that are supported on the front of the body. The mounting system is designed for mounting the beverage handler to a truck or trailer of the type having a frame extending forwardly from the rear wheels and a storage compartment disposed rearwardly of the rear wheels and the rearmost end of the frame. The system includes a support frame designed to attach to the rearmost end of the trailer and a pair of fork tine receiving tubes interconnected with the support frame. The fork tine receiving tubes extend from the frame such that when the frame is mounted against the rear face of the trailer, the tubes extend into the rear of the trailer. The system also includes interconnection members with one end connected to the support frame and a second end connected to the truck frame.

36 Claims, 8 Drawing Sheets

MOUNTING SYSTEM FOR TRUCK MOUNTED BEVERAGE HANDLER

REFERENCE TO RELATED APPLICATION

This application claims priority from U.S. provisional patent application Ser. No. 60/249,013, filed Nov. 15, 2000, the entire contents of which is incorporated herein by reference.

FIELD OF THE INVENTION

The present invention relates generally to mounting systems for attaching a forklift to the rear of a vehicle and, more specifically, to a mounting system for a beverage hauling truck.

BACKGROUND OF THE INVENTION

Forklifts of various kinds are well known in the art. Typically, forklifts include a maneuverable vehicle portion with a pair of fork tines mounted to a mast mechanism on the vehicle portion. The vehicle portion and the tines cooperate to pick up, maneuver, and set down loads. Traditional forklifts are rather large and heavy vehicles that are designed to be used in one area, such as a warehouse, and not to be transported from site to site. More recently, more maneuverable three wheel forklifts have been developed that are designed to be mounted and transported on a truck have been developed. Examples of such forklifts are shown in UK Patent Application GB 2,259,292A and U.S. Pat. No. 4,921,075 to Schumacher et al. This type of forklift has a pair of front wheels or tires and a single rear steering wheel. The forklift mechanism is positioned generally between the front wheels or tires. These types of forklifts are also typically shorter, front to back, than traditional forklifts and their use of a single rear steering wheel makes them highly maneuverable. Also, they are designed to mount on the rear of a truck for transport with the truck.

U.S. Pat. No. 5,575,604 to Dubosh et al. and U.S. Pat. No. 5,749,695 to Moffett et al. both show mounting systems for the newer type of three wheel forklift. In each case, a pair of fork tine receiving slots is provided in the rear of a trailer and interconnects with the truck's frame. To mount the forklift to the rear of the frame, the forklift driver approaches the truck with the tines aligned with the receiving slots. The slots are a distance above the ground or surface on which the forklift and the truck are supported. The forklift operator inserts the tines into the slots until the body of the forklift is close to the back of the truck. At this point, the tines are inserted a significant distance into the slots. The operator then lowers the forklift tines with respect to the body of the forklift. Because the tines are inserted in the slots, this action lifts the body of the forklift off the ground such that the forklift is supported by its tines in the slots. In this way, the forklift is "piggybacked" on the rear end of the trailer with the mounting system. Preferably, the mounting system also includes additional support for the forklift so that the entire force of supporting the forklift is not passed through the tines. For example, in the Moffett et al. patent, a pair of wheel rests is provided aligned with the front wheels on the forklift. After lifting the forklift off the ground by its tines, the operator hydraulically retracts the tines towards the forklift, thereby pulling the body of the forklift towards the rear of the trailer. In this way, the user positions the front wheels on top of the wheel rests and then lowers the forklift body until the wheel rests are taking a significant portion of the load of the forklift. As shown in the Moffett et al. patent, the wheel rests are actually recessed below the underside of the rear of the truck trailer, requiring the trailer to have a significant overhang behind its rear wheels. Chains or other supports may also be provided for interconnecting the body of the forklift with the trailer. In the Dubosh et al. patent, a pair of lock supports are provided on the rear of the trailer for interconnecting the frame of the forklift with the frame of the trailer when the forklift is in the transport position. In this way, the lock and support structure takes the load of the forklift.

The mounting systems thus far described are typically provided on heavy duty flatbed trucks or trailers designed to transport heavy items such as construction materials. These trucks or trailers typically include a backbone frame that runs the entire length of the trailer and extends completely to the rear end of the trailer. The mounting system is welded or otherwise interconnected with the rear ends of the backbone frame of these trailers allowing the backbone frame structure to take the load of the mounting system and its associated forklift. The weight of the forklift is often insignificant in comparison with the heavy loads the trailer is designed to accommodate. Therefore, the mounting system does not produce structural challenges or require extensive modification to the rear of the trailer.

Forklift type material handling devices are also useful in applications other than the transportation of very heavy objects. For example, material handling devices are very helpful in the field of beverage delivery. Soft drink and beer delivery trucks deliver soft drinks and beer to retail outlets, often in large quantities. Typically, the beverages are stacked on pallets or crates in large stacks and are then placed in beverage delivery trucks. These trucks have multiple compartments arranged along the sides with each compartment designed to hold a stack of pallets or cartons of beverage. Traditionally, beverage hauling trucks haul a large stack of individual cases or cartons of beverage in each compartment. When a delivery driver arrives at a retail location, he or she unloads individual cases and cartons from the various compartments onto a handcart. The handcart, with its load, is then rolled into the retail location for delivery of the beverages. Obviously, handling large numbers of heavy cases and cartons of beverages in this manner is tiring and time consuming. Small versions of the type of forklift previously described can be very useful in this type of application. The forklift is capable of lifting a large stack of beverages out of a compartment in the beverage truck without requiring the operator to individually handle the cases or cartons of beverage. Preferably, the assorted orders for each retail location are sorted and palletized prior to loading into the beverage truck. Then, it is only necessary for the operator to deliver a presorted pallet to each retail location, thereby significantly reducing the amount of time and effort required. However, these pre-palletized loads require the use of a forklift type device to lift as a single unit. Forklifts for this application are often referred to as beverage handlers.

In light of the above, there is a need to transport material handling devices, such as forklifts, along with a beverage truck to ease the delivery of heavy palletized loads of beverages. Unfortunately, beverage trucks are not typically constructed in the same manner as trucks that normally transport a forklift. Beverage trucks or trailers typically include a central backbone frame, which may consist of a pair of opposed C-shaped channels. A central wall extends, front to rear, down the entire length of the trailer and may be positioned between the backbone frame members. Cargo boxes are arranged down the sides and/or across the back of the trailer and interconnected with the frame and/or central wall. The cargo boxes are interconnected and form the outer shape of the trailer. Each of these container boxes is designed to hold stacks of beverages. In order to maximize the amount of beverages that the trailer can transport, container boxes are often provided behind the rear axle as well. However, the central backbone or frame of the truck terminates at the rear wheels. Therefore, the container boxes positioned behind the rear axle have very little structure, as compared with heavy duty flatbed trucks and trailers wherein the frame extends entirely to the rear of the trailer. Therefore, traditional approaches to mounting three wheel forklifts to the back of heavy duty trucks and trailers do not work with typical beverage hauling trucks and trailers because of the lack of structure at the rearmost end of the trailer.

SUMMARY OF THE INVENTION

The present invention provides a solution to the problem of providing a mounting system on the rear of a beverage truck for transporting a forklift. In one embodiment of the present invention, the mounting system is for a truck-mounted beverage hauler of the type having a body and a pair of fork tines that are movable with respect to the body and mounted generally to the front of the body. The beverage handler also has a pair of front wheels supported on the front of the body. The mounting system is designed for mounting the beverage handler to a trailer of the type having a frame extending forwardly from the rear wheels and a storage compartment disposed rearwardly of the rear wheels and the rearmost end of the frame. The system includes a support frame designed to attach to the rearmost end of the trailer and a pair of fork tine receiving tubes. The tubes are interconnected with the support frame and extend from the frame such that when the frame is mounted against the rear face of the trailer, the tubes extend into the trailer. A support rod has a first end interconnected with the support frame and a second end configured for interconnection with the rearmost end of the truck frame.

Another embodiment of the present invention is designed for trailers not having a compartment behind the rear end of the frame. In this embodiment, a pair of frame assembly connection members are provided that are designed to interconnect with the frame assembly of the truck for supporting the support frame. Wheel pockets are provided on the rearward side of the support frame to receive the front wheels of the fork lift.

DETAILED DESCRIPTION OF THE PREFERRED EMBODIMENTS

Referring to FIGS. 1A–1E, a series of drawings illustrates a forklift type beverage handler and the procedure for mounting it to a mounting system according to the present invention on the rear of a beverage hauling truck. The beverage handling forklift is generally shown at 10 with the rear of the trailer shown at 12. The beverage handler 10 includes a body 14 with a pair of front wheels 16 and a steerable rear wheel 18. The front wheels, in this version of the beverage handler, are hydraulically telescopic. In the first drawing, the front wheels 16 are shown in their extended position with them positioned forwardly of the remainder of the body 14. In the second drawing, the front wheels are retracted to a position adjacent the body 14. In their extended position, the front wheels provide additional stability and load carrying capability. Their retracted position allows for mounting of the beverage handler to the truck and for increased maneuverability. The beverage handler 10 also includes a pair of fork tines 20 which are movable upwardly and downwardly on a mast 22. Fork tines come in a variety of configurations and sizes. Typical tines for beverage handlers are approximately 2½ inches thick and 6½ inches wide with a length between 37 and 42 inches, though other sizes may be used. In some embodiments, the fork tines 20 are also movable side to side. Preferably, the fork tines include extendable portions 24 which may be moved forwardly and backwardly with respect to the remainder of the tines. The mast 22 preferably tilts forwardly and backwardly for additional material handling capability.

The trailer 12 includes a mounting system according to the present invention. The mounting system includes a pair of fork tine engaging tubes 26, a pair of wheel pockets 28, and chain connecting attachment points 30. As shown in the series of drawings in FIGS. 1A–1E, the beverage handler 10 is attached to the trailer by first approaching the truck with the tines 20 aligned with the tubes 26. The front wheels 16 are retracted towards the front of the beverage handler 10 and the tines 20 are inserted into the tubes 26. If the tines 20 include a movable portion 24, the movable portion may be moved forward to fully engage the movable portion with the tubes 26. The forks 20 are then lowered with respect to the body 14, thereby raising the beverage handler 10 off the ground. The beverage handler 10 is then moved forward to locate the front wheels 16 over the wheel pockets 28, either by retracting the movable portions 24 of the tines 20 or by tilting the mast 22. Once the front wheels 16 are positioned over the pockets 28, safety chains 32 are connected between the attachment points 30 and rear attachments points 34 on the beverage handler. Then the body 14 of the beverage handler 10 is lowered to rest the front wheels 16 in the pockets 28 and to tension the chains. The chains are preferably pre-sized to properly position the beverage handler.

Beverage hauling trailers for use with the present invention generally come in two versions. In both versions, the trailer has rear wheels and a rear wheel area and a frame assembly that extends forwardly from the rear wheel area. A plurality of beverage containing storage compartments are arranged along the sides and/or back of the trailer. In one type of trailer, beverage storage compartments are arranged behind the rear wheel area such that they are behind the rearmost end of the frame assembly that extends forwardly from the rear wheel area. The rearmost wall of the trailer is defined by the rear end of these compartments. In the other version, compartments behind the rear wheels are dispensed with, and the rear wall of the trailer is instead positioned just behind the rear wheels and much closer to the rearmost end of the frame assembly. Different embodiments of the present invention are designed to work with each of these trailer designs. In each case, the frame assembly of the trailer typically consists of a pair of frame rails, which are often C-shaped, that are positioned side-by-side near the longitudinal center line of the trailer and extend forwardly.

Figure 1A:
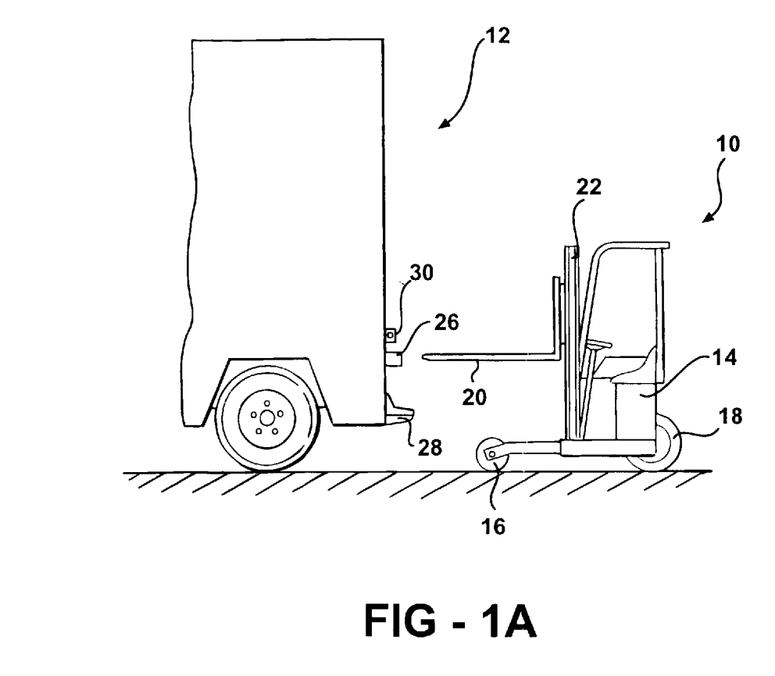
FIG. 1A is a side elevational view of a beverage handler and a portion of a rear end of a beverage trailer, with the fork tines on the beverage handler aligned for engagement with a mounting system according to the present invention.
Figure 1B:
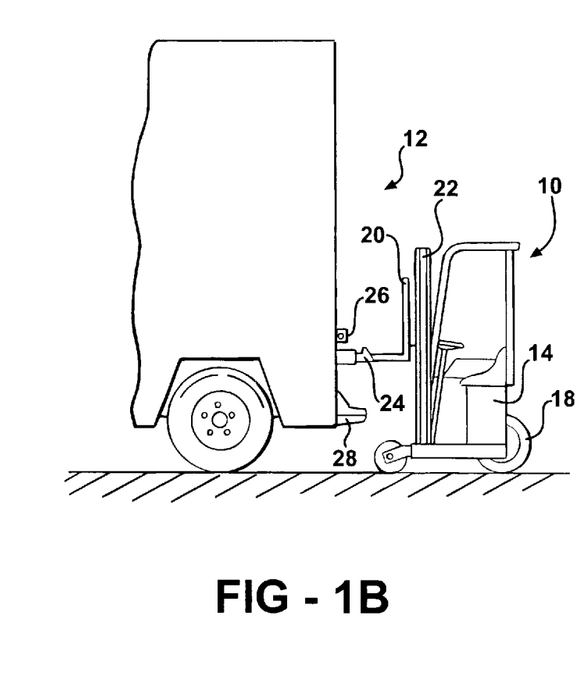
FIG. 1B is a side elevational view similar to FIG. 1A but with the beverage handler having its fork tines partially engaged with the mounting system.
Figure 1C:
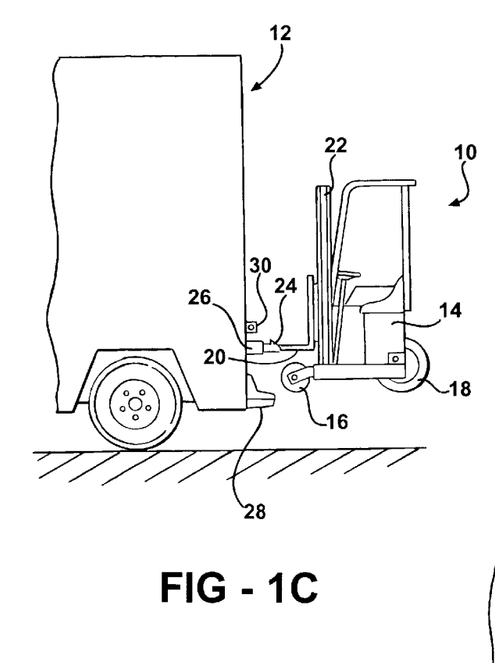
FIG. 1C is a side elevational view similar to FIGS. 1A and 1B with the body of the beverage handler lifted off of the ground by the tines.
Figures 1D, 1E:
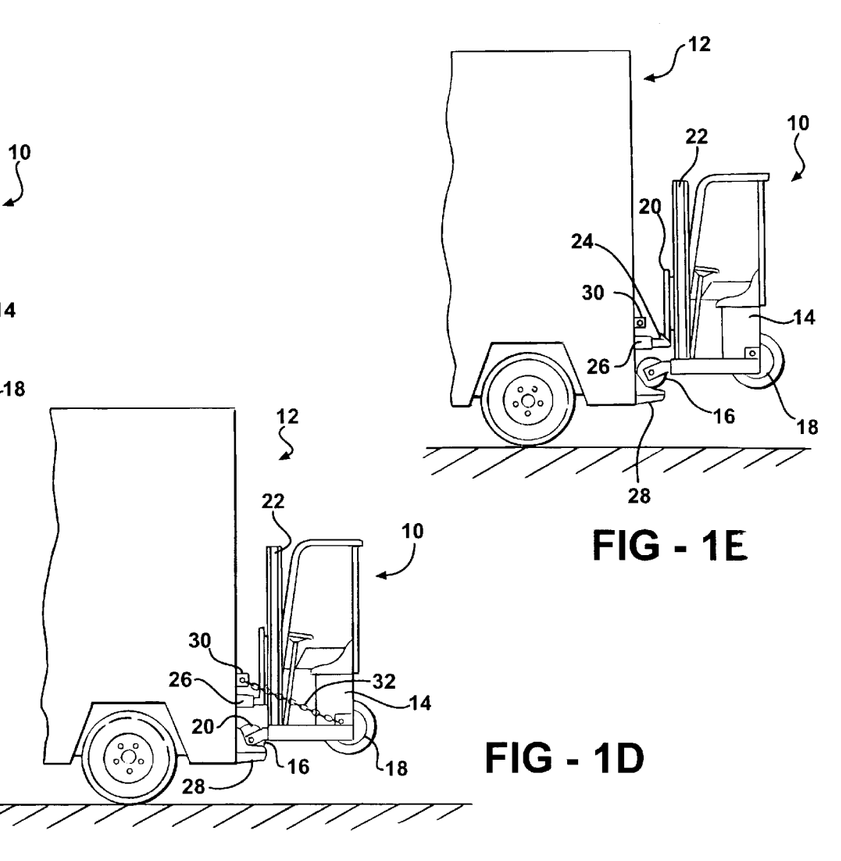
FIG. 1D is a side elevational view similar to FIGS. 1A–1C wherein the body of the forklift has been drawn towards the back of the trailer such that its front wheels are aligned with wheel pockets.
FIG. 1E is a side elevational view similar to FIGS. 1A–1D wherein the body of the forklift has been lowered such that the front wheels engage the wheel pockets, and showing a support chain interconnecting with the body of the beverage handler rearwardly of the front wheels.
Figure 2:
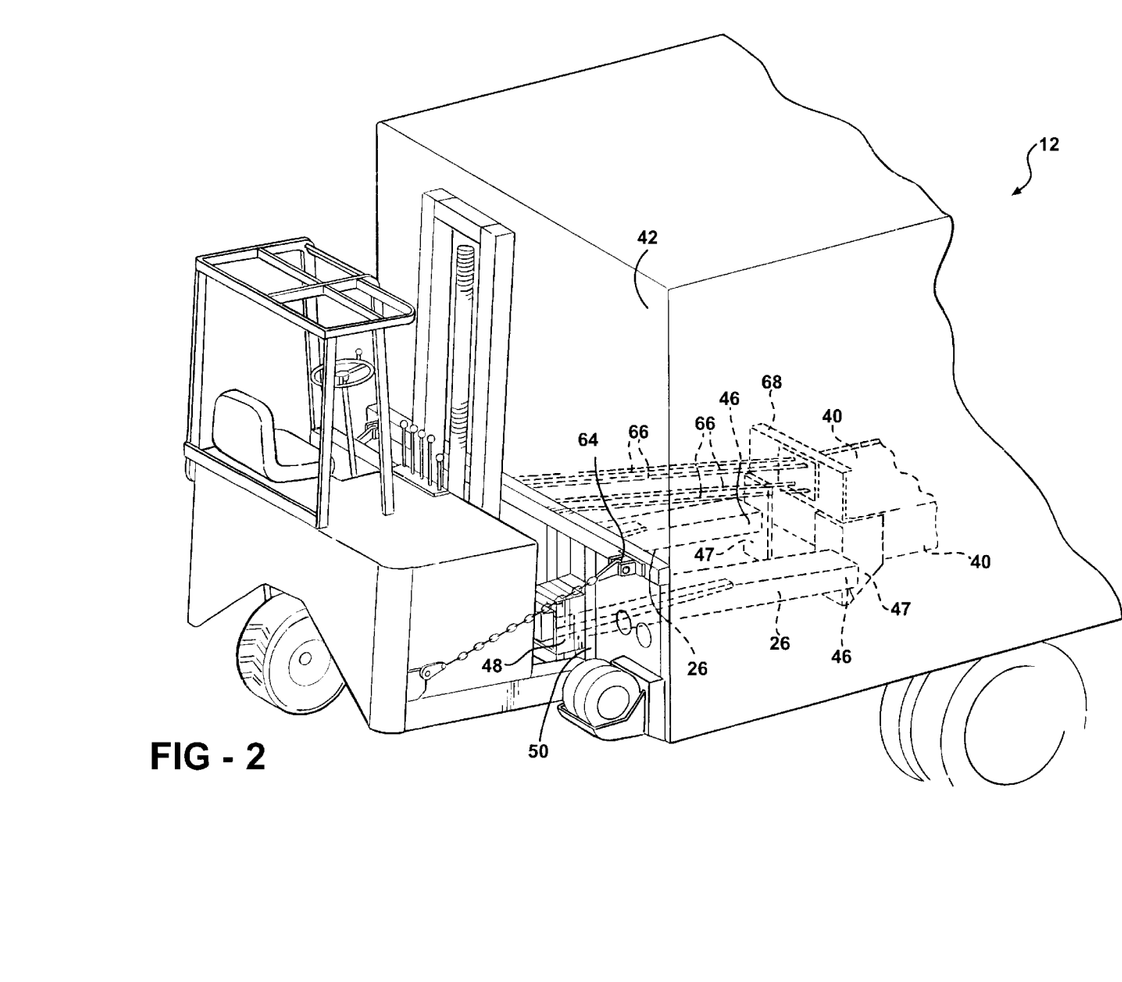
FIG. 2 is a perspective view of a beverage handler and a portion of a rear end of a beverage trailer illustrating the mounting system according to a first preferred embodiment of the present invention.
Figure 3:
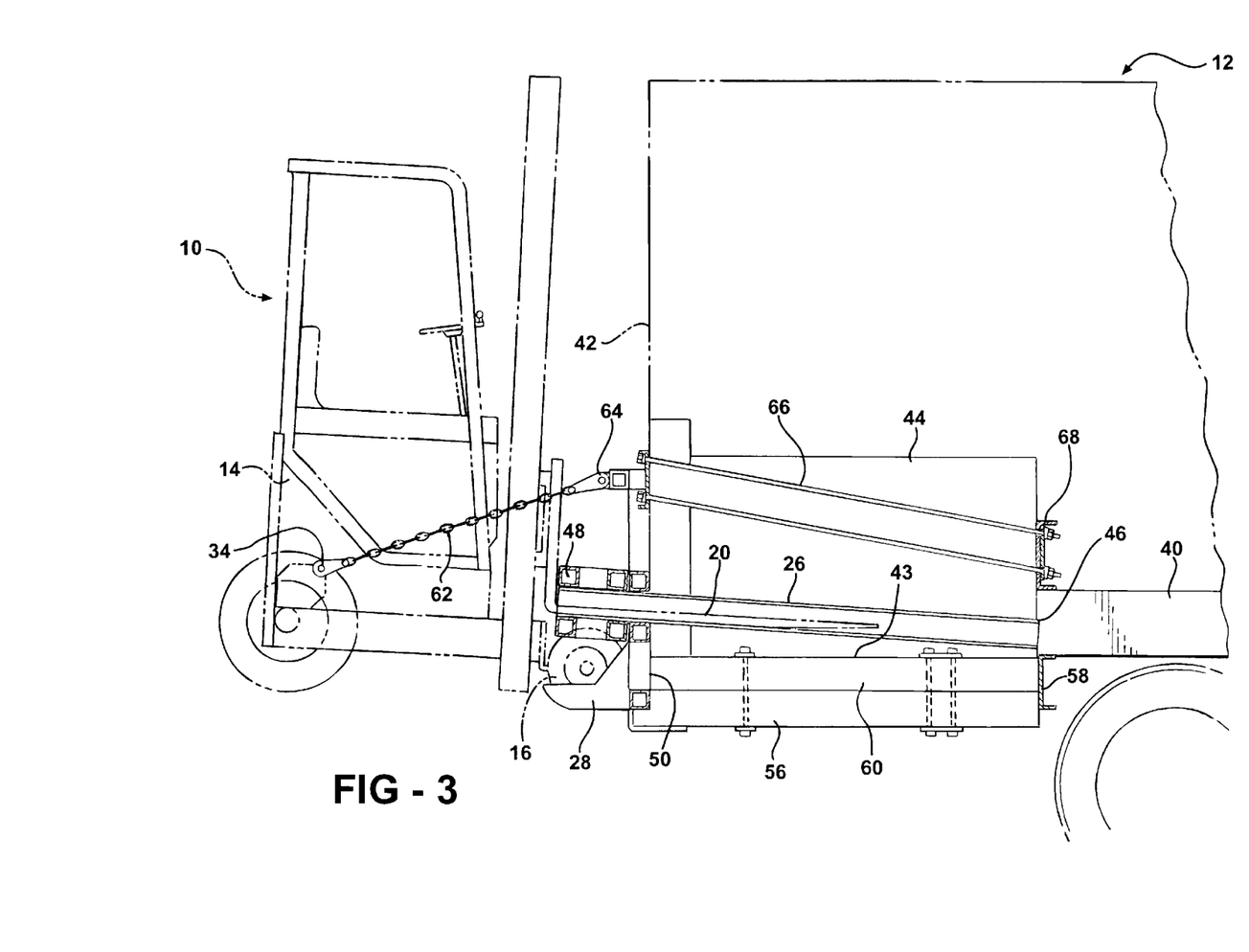
FIG. 3 is a side elevational view, partially in cross-section, of the first embodiment of the mounting system of the present invention.

FIGS. 2 and 3 show perspective and cross-sectional side views, respectively, of the rear of a trailer of the type with a compartment behind the wheels, a mounting system according to the present invention, and a beverage handler mounted to the mounting system. The trailer 12 has a backbone frame consisting of a pair of opposed C-shaped frame rails 40 extending along the length of the trailer, but terminating short of the rearmost end 42 of the trailer. This overhanging portion of the trailer rearward of the rearmost end of the rails 40 consists of beverage container compartments or boxes. The rear beverage container compartments may have various sizes with an interior front-to-rear length of between 38 and 52 inches being typical. These containers or boxes at the rear have a floor 43. The mounting system according to the present invention includes a pair of fork tine receiving tubes 26 which extend from the frame rails rearwardly and extend a short distance out the rearmost end 42 of the trailer 12. The tubes 26 are angled slightly upwardly and may be positioned on or above the floor 43 of the compartment behind the wheels of the trailer. The tubes 26 may be interconnected with the floor 43, or may be just positioned on or above them. The illustrated type of beverage hauling trailer typically has a vertical central wall that extends longitudinally front to back. The central wall divides the compartment behind the rear wheels and is illustrated in FIG. 3 at 44. This central wall is left out of FIG. 2 for purposes of clarity. One of the fork tine receiving tubes 26 is positioned on each side of the central wall 44. If the rearmost compartment is to be used following installation of a mounting system according to the present invention, a new false floor may be built above the tubes 26, or a cover may be fashioned around the tubes.

Figure 5:
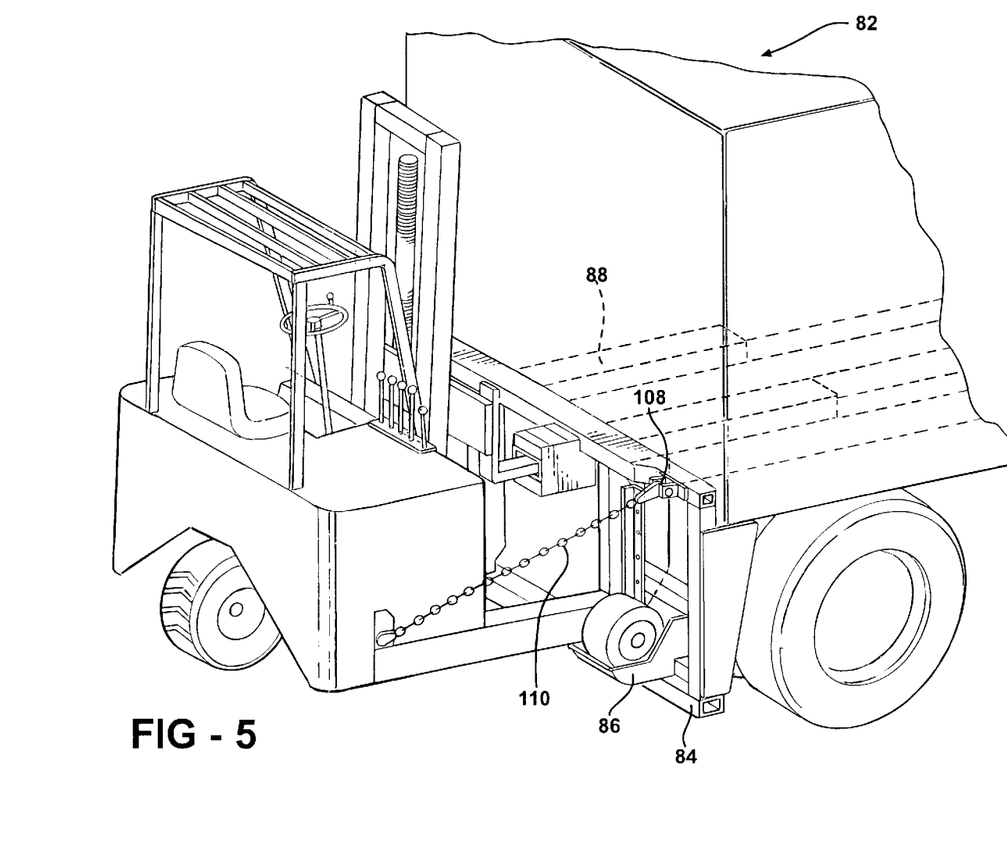
FIG. 5 is a perspective view of a beverage handler and a portion of a beverage trailer with a mounting system according to a second embodiment of the present invention.

In one embodiment, the tubes 26 are four inch tall by eight inch wide (outside dimension) steel tubing with a ¼ inch wall thickness. The tubes 26 preferably extend beyond the rearmost end 42 of the trailer, by approximately 10 inches in some embodiments, as shown in FIG. 5. The forwardmost ends 46 of the tubes 26 may be interconnected with the rear end of the frame rails 40 in any of a variety of ways, such as bracketing and welding or bolting. Trucks and trailers for beverage hauling differ in how much structure is in the rearmost compartment rear of the rear wheels of the trailer. In some cases, there may be sufficient structure rearward of the rear wheels to support the tubes 26 without direct interconnection to the frame rails 40. In others, more significant interconnection is required. In FIG. 2, the tubes 26 are shown having their forwardmost ends 46 interconnected with the frame rails 40 by angled connection plates 47. By positioning the tubes 26 against the floor 44 of the rearmost compartment, most of the storage available in the rearmost compartment is not diminished.

As mentioned previously, the tubes 26 preferably extend outwardly beyond the rearmost end 42 of the trailer by a short distance. This helps to support the fork tines 20 when they are used to lift the beverage handler 10 into the mounting position. Preferably, a support structure 48 is provided surrounding the rearmost ends of the tubes 26. The support structure 48 consists of tubes and/or plates designed to structurally reinforce the portion of the tubes 26 extending out the back 42 of the trailer 12. The support structure 48 may also be referred to as reinforcing collars for the fork tine tubes 26. In the illustrated embodiment, a pair of reinforcing plates are positioned against the sides of the tubes 26 such that they sandwich the tubes. The plates are taller than the tubes such that they extend above and below the tubes. Square tubing extends transversely between the plates to tie the structure together. In alternative approaches, plates are provided around the tubes, or the tubes are otherwise reinforced or boxed in to reinforce and support the ends of the tubes 26.

A support frame 50 is also provided on the rear end 42 of the trailer 12 with the support frame 50 interconnecting with the reinforcing collars 48 and the tubes 26. A pair of wheel pockets 28 is provided on the rear of the support frame 50. The size and structure of the wheel pockets depends on the design of the beverage handler to be transported. In a typical embodiment, the front wheels of the beverage handler have approximately a 12 inch diameter. Therefore, the wheel pockets are sized to receive this size of wheel. In this embodiment, the wheel pockets may be formed out of ⅜ inch thick steel. It should be noted that for some applications, the tubes may not need to extend further out the rear of the trailer and the reinforcing collars may not be necessary. Instead, additional load may be taken by the tines.

Figure 4:
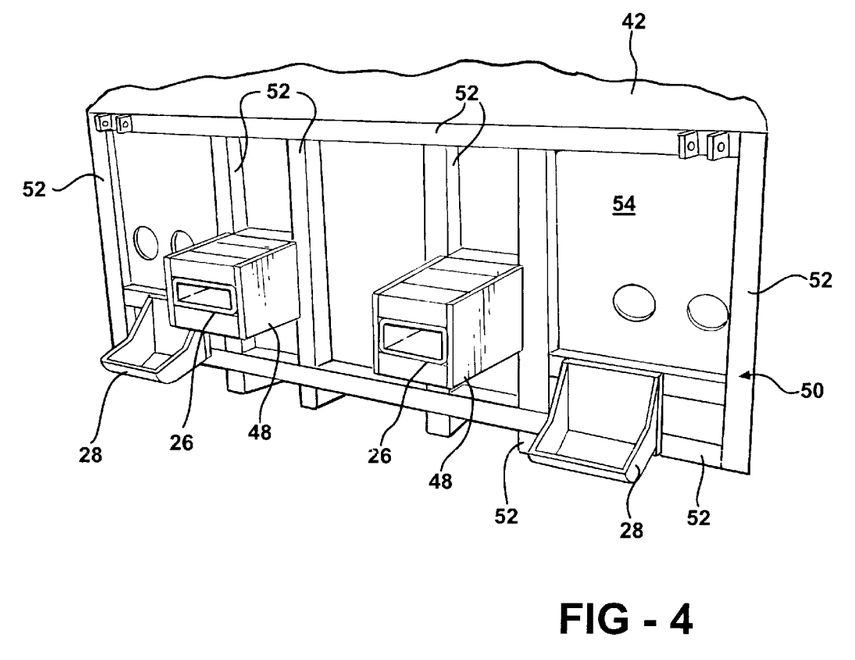
FIG. 4 is a perspective view of the support frame portion of the first embodiment of the present invention.

FIG. 4 shows a rear perspective view of the support frame 50 with the reinforcing collars 48 and wheel pockets 28 connected thereto. As shown, the support frame 50 is generally planar and installed in a vertical position. It includes a plurality of horizontal and vertical structural steel frame members 52 that are interconnected together so as to from the support frame 50. In the illustrated embodiment, a pair of horizontal members and a pair of vertical members form a perimeter structure for the support frame 50. The dimensions and strengths of the members making up the frame 50 may vary depending on the application. In one embodiment, the upper horizontal rail is 3 inches by 6 inches with a ¼ inch wall thickness. The bottom horizontal rail may be 3 inches by 3 inches with a ¼ inch wall. In embodiments of the present invention where the support frame 50 is bolted to the frame of the truck, the size of the bottom horizontal member may be increased to 3 inches by 6 inches. The vertical rails may be 3 inches by 3 inches with a 14 inch wall thickness. A vertical panel 54 may fill in the spaces between the vertical and horizontal frame members 52 and provide additional strength and stiffness. The frame members 52 are preferably welded together so as to provide a very rigid and strong assembly. The reinforcing collars 48 are welded to some of the frame members 52, as are the wheel pockets 28. The fork tine tubes 26 are welded to the frame members 52 and/or the reinforcing collars 48. Therefore, the entire assembly is structurally tied together so as to distribute force.

The support frame 50 is connected to the rearmost wall 42 of the trailer so as to tie them together. They may be interconnected in a variety of ways. In some trailers, the rearmost compartment of the trailer may have sufficient strength to support vertical loads exerted thereon by support frame 50. However, the mounting system according to the present invention preferably includes additional reinforcing members to reinforce the structure at the rear of the trailer. Referring to FIG. 3, horizontal lower reinforcing members 56 may extend between the lower edge of the support frame 50 to a position near the rearmost end of the frame rails 40 of the trailer 12. A transverse beam 58 is illustrated interconnected with the forwardmost end of the reinforcing member 56 so as to interconnect the members 56 with the frame rail 40. Also, the reinforcing member 56 may be bolted or otherwise interconnected with the floor 43 and any existing structure of the trailer, such as shown by beam 60. If a beam such as 60 is not provided, it may be added as needed. The reinforcing member 56 helps tie the support frame 50 to the frame rails 40 of the trailer so as to compensate for the lack of structure rearwardly of the rear wheels. Alternative or additional structural elements may be provided depending on the design of the trailer and the expected loads.

According to the present invention, it is preferred to provide a support chain 62 for interconnection between an attachment point 34 on the body 14 of the beverage handler 10 and some portion of the trailer. Such a chain takes a significant portion of the load associated with transporting the beverage handler 10. However, providing an attachment point for the forward end of the chain 62 presents significant challenges. As will be clear to those of skill in the art, even with the beverage handler 10 supported by its tines 20 in the tubes 26 and the front wheels 16 resting in the wheel pockets 28, there is a significant load trying to twist the beverage handler 10 downwardly and rearwardly off the back of the trailer 12. This is because the center of gravity of the beverage handler 10 is rearward of the attachment locations. Typically, a transport chain is used to resist this load. Referring again to FIGS. 2 and 3, an attachment point 64 is structurally tied into the frame rails 40 of the trailer 12 so as to resist downwardly twisting loads. In the illustrated embodiment, the attachment point 64 forms part of the upper end of the support frame 50.

Interconnection members 66 tie the upper end of the support frame 50 into the frame using an attachment plate 68 interconnected with the rear of the frame rails 40. This attachment plate 68 may be either existing structure in the trailer or may be added as pair of installation of the mounting system. In one preferred embodiment, the interconnection members 66 are four five-eighths inch rods extending between the upper end of the support frame 50 and the attachment plate 68 which is interconnected with the frame rails 40. These rods 66 are in tension and pass the load from the chain 62 to the frame and frame rails 40 of the trailer 12. The length of the rods 66 depend on the distance between the rear wall of the trailer and tie rearmost ends of the frame. Obviously, trailers having larger rear compartments require linger rods. In some embodiments, the rods have a length of approximately 72 inches, but may be trimmed shorter before or after installation.

As mentioned previously, a central wall, such as a composite wall or plywood wall typically extends the entire length of the trailer, bisecting it into halves. The central wall may pass between the rods 66. As best shown in FIG. 2, the rods consist of an upper pair and lower pair with each pair having a short space between them which may accommodate the wall that defines the central wall of the trailer 12.

The chain 62 interconnects the attachment point 64 with an attachment point 34 on the beverage handler 10. As will be clear to those of skill in the art, even without the chain 62 connected, the support frame 50 is subjected to similar outwardly twisting forces due to the force exerted by the tines and the wheels. The rods 66 also serve to help resist this force. The rods 66 may pass through the rear compartment. In this case, a cover may be provided for covering the rods. While the rods 66 are illustrated as interconnected with the frame rails 40 using the attachment plate 68, they may also be connected in other ways. Also, interconnection members other than rods 66 may be used for interconnecting the upper part of the support frame 50 with the frame of the trailer. The illustrated arrangement provides that the rear compartments may still be used after the trailer is modified to mount the mounting system according to the present invention. The support frame 50 transmits the loads between the various portions to the support rod 66 and thereby to the frame rails 40.

Figure 6:
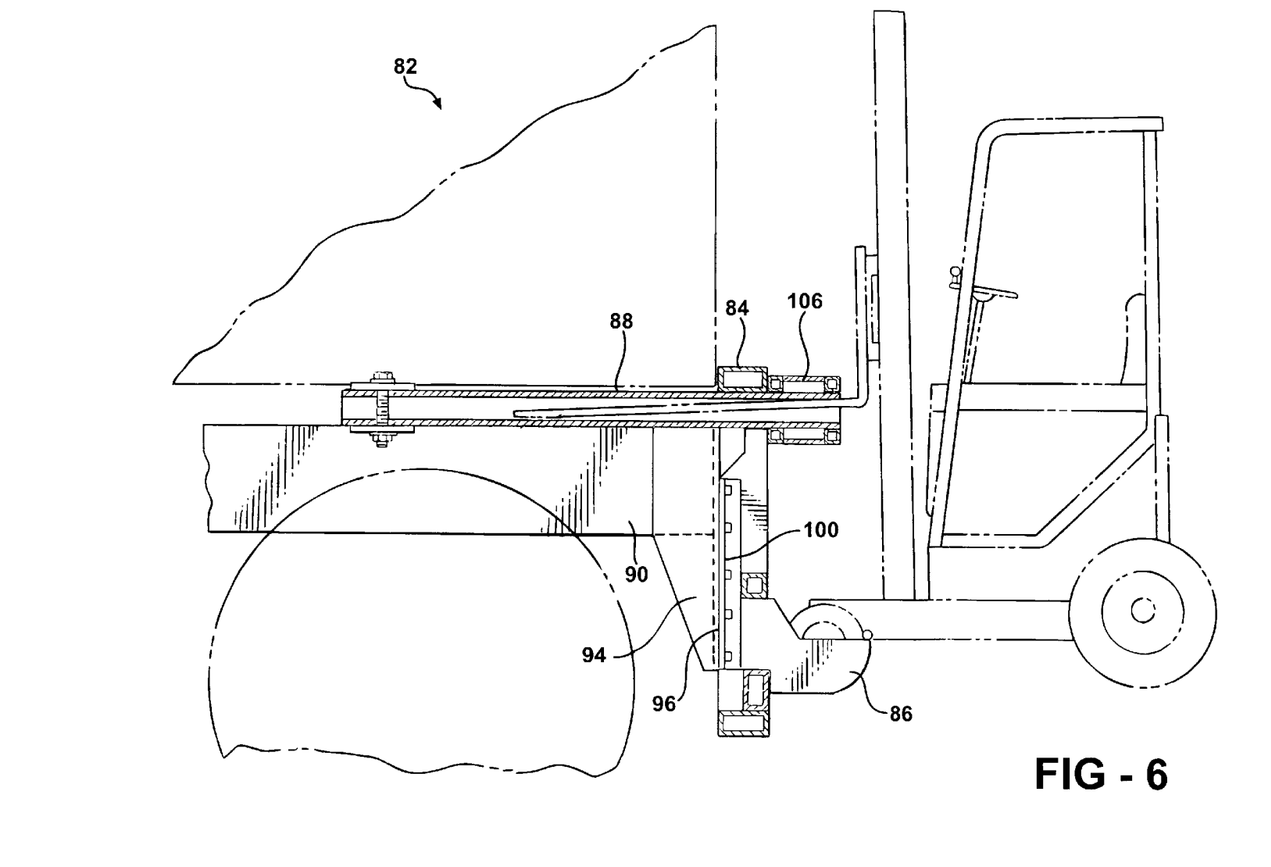
FIG. 6 is a side elevational view, partially in cross-section, of the second embodiment of the mounting system.
Figure 7:
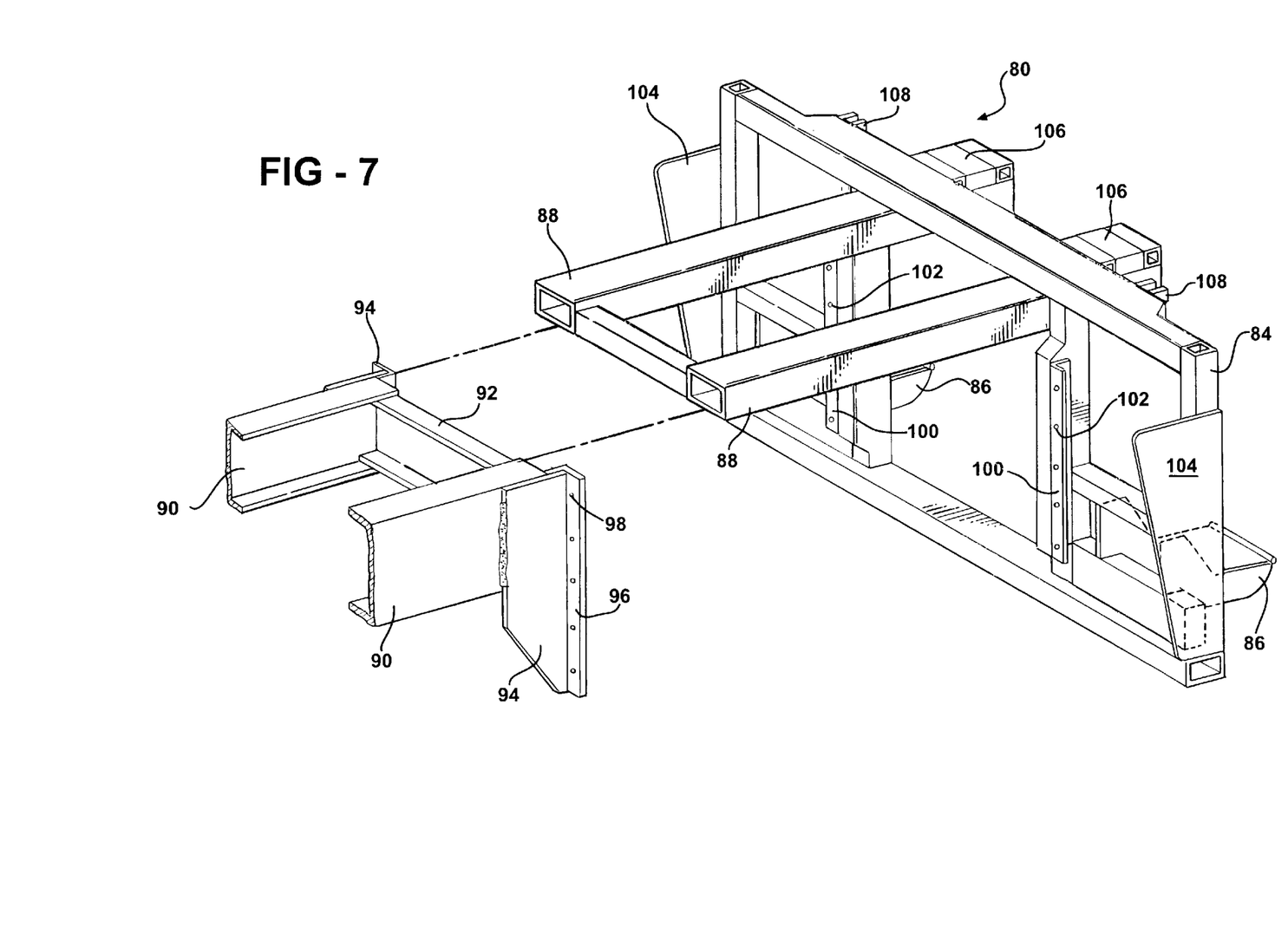
FIG. 7 is a perspective of the major components of the mounting system according to the second preferred embodiment of the present invention.

Referring now to FIGS. 5–7, a second embodiment of a mounting system according to the present invention is shown. This embodiment differs from the previous embodiment in that it is designed for the type of trailer without the rear compartment behind the rear wheels. Therefore, this system can more easily tie into the existing structure of the trailer, without the need for transferring the force forward through a compartment to the frame of the trailer. Referring to FIG. 7, the mounting system by itself is generally shown at 80. The mounting system 80 is designed for interconnection with a trailer 82 as shown in FIGS. 5 and 6. This mounting system is similar to the previous system in that it includes a support frame 84 consisting of steel structural members. The frame 84 supports a pair of wheel pockets 86 and is interconnected with fork tine receiving tubes 88 which extend inwardly into the rear of the trailer 82. However, as shown, the receiving tubes 88 may be positioned higher with respect to the wheel pockets 86 and remainder of the frame 84. This also places them higher above the ground than the tubes in the previous embodiment. This is because, as will be clear to those of skill in the art, the floor of the rearmost compartment in a trailer, without a compartment behind the rear wheels, is higher than in the previous version of the trailer. Once again, the tubes 88 may be positioned against the floor of the rearmost compartment so as to minimize loss of storage space. As illustrated in FIG. 6, this positioning of the tubes 88 may place the tubes immediately above the frame rails 90 of the trailer 82. As before, the tubes may be slanted somewhat, or they may be generally horizontal, as shown. As illustrated in FIG. 6, it is preferred that the tubes be bolted or otherwise connected to the frame rail 90. A variety of adapter plates may be used so as to best interconnect the tubes with the frame rail. For example, the frame rails 90 may have transverse connectors extending between them, such as 92 shown in FIG. 7. Additional transverse connectors may be positioned elsewhere on the frame and allow for easy connection with the tubes.

This embodiment of the present invention is designed to be provided as a kit such that it can be preassembled into a support frame, wheel pocket, and tube assembly which may be interconnected with a trailer. The assembly 80 may be interconnected in a variety of ways, including bolting or welding the tubes 80 and some or all of the frame 84 to the existing structure of the trailer. In this version of trailer, the frame of the truck trailer extends generally to or near the rearmost end of the trailer allowing easier connection with the mounting system 80.

One preferred approach to mounting the mounting system 80 to the trailer 82 is illustrated in FIG. 7. In this Figure, the frame rails 90 are shown without the remainder of the trailer for ease of reference. The rearmost ends of the frame rails 90 may be interconnected by a transverse member 92 as illustrated, or the transverse member may be added, as needed. A pair of attachment brackets 94 are preferably attached to the frame rails 90, such as by welding as illustrated. The attachment brackets 94 are generally L-shaped in horizontal cross-section, such that one leg of the L is attached to the frame rail and the other leg of the L extends outwardly. The outwardly extending leg 96 serves as an attachment flange and may have holes 98 provided therein. In one embodiment, the attachment brackets 94 are formed out of ⅜ inch thick steel, though other thicknesses and shapes may be used depending on the application. The support frame 84 has a pair of corresponding attachment flanges 100 with holes 102 positioned so as to align with the holes 98 in the flanges 96. In order to attach the support frame 84 to the trailer, the brackets 94 are first attached to the frame rails 90 and then flanges 96 and 100 may be bolted to one another so as to provide a solid interconnection. Alternatively, the flanges may be interconnected by welding or other approaches. As shown, the support frame 84 may also include side members 104 positioned so as to extend around the side edges of the rearmost end of the trailer when the mounting system 80 is installed. These side members 104 may be bolted or riveted to the sides of the trailer to provide additional interconnection and to protect the rear edges of the trailer.

In another preferred approach of the resent invention, the brackets 94 are pre-installed on trailers such that a kit, such as mounting system 80, may be easily installed by bolting the flanges of the brackets to flanges on the mounting system 80. Alternatively, the brackets 94 may be installed at the time of installation of the mounting system.

As with previous embodiments, the mounting system 80 preferably includes reinforcement collars 106 surrounding the tine receiving tubes 88, which preferably extend rearwardly of the rear face of the support frame 84. Attachment points 108 are provided for attaching the attachment chain 110 between the support frame 84 and the body of the beverage handler rearwardly of the front wheels.

As will be clear to those of skill in the art, the illustrated and discussed embodiments of the present invention may be altered in various ways without departing from the scope or teaching of the present invention. It is the following claims, including all equivalents, which define the scope of the present invention.

I claim:

1. A mounting system for a truck mounted beverage handler of the type having a body and a pair of fork tines movable with respect to the body and mounted generally on the front of the body, the handler further having a pair of front wheels supported on the front of the body, the system designed for mounting the beverage handler to a trailer of the type having a frame extending forwardly from the rear wheels and a closable storage compartment disposed rearwardly of the rear wheels and the rearmost end of the frame, the storage compartment having a frontmost wall and a rearmost wall defining a storage space therebetween, the rearmost wall defining a rear wall of the trailer and being spaced from the rearmost end of the frame by a predetermined distance, the system comprising:

a generally planar support frame configured for attachment to the rear wall of the trailer in a generally vertical orientation such that the support frame is spaced from the rearmost end of the frame of the trailer, the support frame having a forward face to be disposed against the rear wall of the trailer and an opposed rearward face;

a pair of elongated fork tine receiving tubes having rear ends interconnected with the support frame and forward ends extending from the forward face of the frame such that when the frame is mounted against the rear wall of the trailer, the tubes extend into the rear of the trailer, the rear ends of the tubes having rearwardly facing fork tine receiving openings; and an elongated interconnection member having a first end configured for connection with the support frame and a second end configured for connection with the rearmost end of the track frame forward of the storage compartment such that the interconnection member extends through the storage compartment, the interconnection member having a length greater than the predetermined distance;

wherein when the support frame is attached to the rear wall of the trailer and the second end of the interconnection member is connected with the rearmost end of the truck frame, the interconnection member extends through the storage compartment.

2. The mounting system according to claim 1, further comprising a pair of wheel receiving pockets configured to receive the front wheels of the beverage handler, the wheel receiving pockets being attached to the rearward face of the support frame.

3. The mounting system according to claim 1, wherein the support frame has an upper portion and a lower portion, the first end of the interconnection member being configured to connect with the upper portion of the support frame.

4. The mounting system according to claim 3, wherein the interconnection member comprises a plurality of elongated rods.

5. The mounting system according to claim 1, wherein the rear ends of the receiving tubes extend rearwardly from the rearward face of the support frame.

6. A mounting system for a truck mounted beverage handler of the type having a body and a pair of fork tines movable with respect to the body and mounted generally on the front of the body, the handler further having a pair of front wheels supported on the front of the body, the system designed for mounting the beverage handler to a trailer of the type having a frame extending forwardly from the rear wheels and a storage compartment disposed rearwardly of the rear wheels and the rearmost end of the frame, the storage compartment having a rearmost wall defining a rear wall of the trailer, the system comprising:

a generally planar support frame configured for attachment to the rear wall of the trailer in a generally vertical orientation, the support frame having a forward face to be disposed against the rear wall of the trailer and an opposed rearward face;

a pair of elongated fork tine receiving tubes having rear ends interconnected with the support frame and forward ends extending from the forward face of the frame such that when the frame is mounted against the rear wall of the trailer, the tubes extend into the rear of the trailer, the rear ends of the receiving tubes extending rearwardly from the rearward face of the support frame and having rearwardly facing fork tine receiving openings;

a reinforcing collar surrounding and supporting the rear ends of each of the receiving tubes, the collars being interconnected with the support frame; and an elongated interconnection member having a first end configured for connection with the support frame and a second end configured for connection with the rearmost end of the truck frame forward of the storage compartment;

wherein when the support frame is attached to the rear wall of the trailer and the second end of the interconnection member is connected with the rearmost end of the truck frame, the interconnection member extends through the storage compartment.

7. A mounting system for a truck mounted beverage handler of the type having a body and a pair of fork tines movable with respect to the body and mounted generally on the front of the body, the handler further having a pair of front wheels supported on the front of the body, the system designed for mounting the beverage handler to a trailer of the type having a frame extending forwardly from the rear wheels and a closable storage compartment disposed rearwardly of the rear wheels and the rearmost end of the frame, the storage compartment having a frontmost wall and a rearmost wall defining a storage space therebetween, the rearmost wall defining a rear wall of the trailer and being spaced from the rearmost end of the frame by a predetermined distance, the system comprising:

a generally planar support frame attached to the rear wall of the trailer in a generally vertical orientation such that the support frame is spaced from the rearmost end of the frame of the trailer, the support frame having a forward face to be disposed against the rear wall of the trailer and an opposed rearward face;

a pair of elongated fork tine receiving tubes having rear ends interconnected with the support frame and forward ends extending from the forward face of the support frame such that the tubes extend into the rear of the trailer and into the storage compartment, the rear ends of the tubes having rearwardly facing fork tine receiving openings; and an elongated interconnection member having a first end connected with the support frame and a second end connected with the rearmost end of the truck frame forward of the storage compartment such that the interconnection member extends through the storage compartment, the interconnection member having a length greater than the predetermined distance.

8. The mounting system according to claim 7, further comprising a pair of wheel receiving pockets configured to receive the front wheels of the beverage handler, the wheel receiving pockets being attached to the rearward face of the support frame.

9. The mounting system according to claim 7, wherein the interconnection member comprises a plurality of elongated rods and the support frame has an upper portion and a lower portion, one end of the each of the rods being connected with the upper portion of the support frame.

10. The mounting system according to claim 7, wherein the rear ends of the receiving tubes extend rearwardly from the rearward face of the support frame.

11. A mounting system for a truck mounted beverage handler of the type having a body and a pair of fork tines movable with respect to the body and mounted generally on the front of the body, the handler further having a pair of front wheels supported on the front of the body, the system designed for mounting the beverage handler to a trailer of the type having a frame extending forwardly from the rear wheels and a storage compartment disposed rearwardly of the rear wheels and the rearmost end of the frame, the storage compartment having a floor and a central vertical wall extending front to rear, the storage compartment further having a rearmost wall defining a rear wall of the trailer, the system comprising:

a generally planar support frame attached to the rear wall of the trailer in a generally vertical orientation, the support frame having a forward face to be disposed against the rear wall of the trailer and an opposed rearward face;

a pair of elongated fork tine receiving tubes having rear ends interconnected with the support frame and forward ends extending from the forward face of the support frame such that the tubes extend into the rear of the trailer, the receiving tubes extending into the storage compartment adjacent the floor, with one tube on each side of the vertical wall, the rear ends of the tubes having rearwardly facing fork tine receiving openings; and an elongated interconnection member having a first end connected with the support frame and a second end connected with the rearmost end of the truck frame forward of the storage compartment.

12. The mounting system according to claim 11, wherein the receiving tubes are attached to the floor.

13. A mounting system for a truck mounted beverage handler of the type having a body and a pair of fork tines movable with respect to the body and mounted generally on the front of the body, the handler further having a pair of front wheels supported on the front of the body, the system designed for mounting the beverage handler to a trailer of the type having a frame extending forwardly from the rear wheels and a storage compartment disposed rearwardly of the rear wheels and the rearmost end of the frame, the storage compartment having a floor and a central vertical wall extending front to rear, the storage compartment further having a rearmost wall defining a rear wall of the trailer, the system comprising:

a generally planar support frame attached to the rear wall of the trailer in a generally vertical orientation, the support frame having a forward face to be disposed against the rear wall of the trailer and an opposed rearward face;

a pair of elongated fork tine receiving tubes having rear ends interconnected with the support frame and forward ends extending from the forward face of the support frame such that the tubes extend into the rear of the trailer, the rear ends of the tubes having rearwardly facing fork tine receiving openings; and an elongated interconnection member having a first end connected with the support frame and a second end connected with the rearmost end of the truck frame forward of the storage compartment, the interconnection member extending through the storage compartment adjacent the central wall.

14. The mounting system according to claim 13, wherein the interconnection member comprises a plurality of elongated rods.

15. A mounting system for a truck mounted beverage handler of the type having a body and a pair of fork tines movable with respect to the body and mounted generally on the front of the body, the handler further having a pair of front wheels supported on the front of the body, the system designed for mounting the beverage handler to a trailer of the type having a frame extending forwardly from the rear wheels and a storage compartment disposed rearwardly of the rear wheels and the rearmost end of the frame, the storage compartment having a rearmost wall defining a rear wall of the trailer, the system comprising:

a generally planar support frame configured for attachment to the rear wall of the trailer in a generally vertical orientation, the support frame having a forward face to be disposed against the rear wall of the trailer and an opposed rearward face, the support frame further having an upper portion and a lower portion;

a pair of elongated fork tine receiving tubes having rear ends interconnected with the support frame and forward ends extending from the forward face of the frame such that when the frame is mounted against the rear wall of the trailer, the tubes extend into the rear of the trailer, the rear ends of the tubes having rearwardly facing fork tine receiving openings;

an elongated interconnection member having a first end configured for connection with the upper portion of the support frame and a second end configured for connection with the rearmost end of the track frame forward of the storage compartment; and a pair of connection members each having a first end connected to the upper portion of the support frame and a second end configured to connect to the beverage handler rearwardly of the front wheels;

wherein when the support frame is attached to the rear wall of the trailer and the second end of the interconnection member is connected with the rearmost end of the truck frame, the interconnection member extends through the storage compartment.

16. A mounting system for a truck mounted beverage handler of the type having a body and a pair of fork tines movable with respect to the body and mounted generally on the front of the body, the handler further having a pair of front wheels supported on the front of the body, the system designed for mounting the beverage handler to a trailer of the type having a frame extending forwardly from the rear wheels and a storage compartment disposed rearwardly of the rear wheels and the rearmost end of the frame, the storage compartment having a rearmost wall defining a rear wall of the trailer, the system comprising:

a generally planar support frame attached to the rear wall of the trailer in a generally vertical orientation, the support frame having a forward face to be disposed against the rear wall of the trailer and an opposed rearward face;

a pair of elongated fork tine receiving tubes having rear ends interconnected with the support frame and forward ends extending from the forward face of the support frame such that the tubes extend into the rear of the trailer, the rear ends of the receiving tubes extending rearwardly from the rearward face of the support frame and having rearwardly facing fork tine receiving openings;

a reinforcing collar surrounding and supporting the rear ends of each of the receiving tubes, the collars being interconnected with the support frame; and an elongated interconnection member having a first end connected with the support frame and a second end connected with the rearmost end of the truck frame forward of the storage compartment.

17. A beverage hauling trailer with a beverage handler mount for hauling a beverage handler of the type having a body and a pair of fork tines movable with respect to the body and mounted generally to the front of the body, the handler further having a pair of front wheels supported on the front of the body, the trailer comprising:

a pair of rear wheels disposed in a rear wheel area for supporting the trailer;

a frame having a rearmost end in the rear wheel area, the frame extending forwardly from the rear wheel area;

a closable storage compartment disposed rearwardly of the rear wheels and the rearmost end of the frame, the storage compartment having a frontmost wall and a rearmost wall spaced apart so as to define a storage space therebetween, the rearmost wall defining the rear wall of the trailer and beings spaced from the rearmost end of the frame of the trailer by a predetermined distance;

a mounting system comprising;
a generally planar support frame disposed generally vertically on the rear wall of the trailer such that the support frame is spaced from the rearmost end of the frame of the trailer;
a pair of fork tine receiving tubes interconnected with the support frame and extending from the support frame into the storage compartment; and
an elongated interconnection member having a first end connected with the support frame and a second end connected with the rearmost end of the truck frame forward of the storage compartment, the interconnection member extending through the storage compartment and having a length greater than the predetermined distance.

18. The trailer according to claim 17, further comprising a pair of wheel receiving pockets configured to receive the front wheels of the beverage handler, the wheel receiving pockets being attached to the rearward face of the support frame.

19. The trailer according to claim 17, wherein the support frame has an upper portion and a lower portion, the first end of the interconnection member being connected with the upper portion of the support frame.

20. The trailer according to claim 17, wherein the forward ends of the receiving tubes are connected to the frame of trailer.

21. The trailer according to claim 17, wherein the rear ends of the receiving tubes extend rearwardly from the rearward face of the support frame.

22. A beverage hauling trailer with a beverage handler mount for hauling a beverage handler of the type having a body and a pair of fork tines movable with respect to the body and mounted generally to the front of the body, the handler further having a pair of front wheels supported on the front of the body, the trailer comprising:

a pair of rear wheels disposed in a rear wheel area for supporting the trailer;

a frame having a rearmost end in the rear wheel area, the frame extending forwardly from the rear wheel area;

a storage compartment disposed rearwardly of the rear wheels and the rearmost end of the frame, the storage compartment having a floor and a central vertical wall extending front to rear, the storage compartment further having a rearmost wall defining the rear wall of the trailer;

a mounting system comprising;
a support frame disposed on the rear wall of the trailer;
a pair of fork tine receiving tubes interconnected with the support frame and extending from the support frame into the storage compartment adjacent the floor, with one tube on each side of the vertical wall; and an elongated interconnection member having a first end connected with the support frame and a second end connected with the rearmost end of the truck frame forward of the storage compartment, the interconnection member extending through the storage compartment.

23. The trailer according to claim 22, wherein the receiving tubes are attached to the floor.

24. A beverage hauling trailer with a beverage handler mount for hauling a beverage handler of the type having a body and a pair of fork tines movable with respect to the body and mounted generally to the front of the body, the handler further having a pair of front wheels supported on the front of the body, the trailer comprising:
   a pair of rear wheels disposed in a rear wheel area for supporting the trailer;
   a frame having a rearmost end in the rear wheel area, the frame extending forwardly from the rear wheel area;
   a storage compartment disposed rearwardly of the rear wheels and the rearmost end of the frame, the storage compartment having a floor and a central vertical wall extending front to rear, the storage compartment further having a rearmost wall defining the rear wall of the trailer;
   a mounting system comprising;
      a support frame disposed on the rear wall of the trailer;
      a pair of fork tine receiving tubes interconnected with the support frame and extending from the support frame into the storage compartment; and
      an elongated interconnection member having a first end connected with the support frame and a second end connected with the rearmost end of the truck frame forward of the storage compartment, the interconnection member extending through the storage compartment adjacent the central wall.

25. The trailer according to claim 24, wherein the interconnection member comprises a a plurality of elongated rods.

26. A beverage hauling trailer with a beverage handler mount for hauling a beverage handler of the type having a body and a pair of fork tines movable with respect to the body and mounted generally to the front of the body, the handler further having a pair of front wheels supported on the front of the body, the trailer comprising:
   a pair of rear wheels disposed in a rear wheel area for supporting the trailer;
   a frame having a rearmost end in the rear wheel area, the frame extending forwardly from the rear wheel area;
   a storage compartment disposed rearwardly of the rear wheels and the rearmost end of the frame, the storage compartment having a rearmost wall defining the rear wall of the trailer;
   a mounting system comprising;
      a support frame disposed on the rear wall of the trailer;
      a pair of fork tine receiving tubes interconnected with the support frame and extending from the support frame into the storage compartment, the rear ends of the receiving tubes extending rearwardly from the rearward face of the support frame;
      a reinforcing collar surrounding and supporting the rear ends of each of the receiving tubes, the collars being interconnected with the support frame; and
      an elongated interconnection member having a first end connected with the support frame and a second end connected with the rearmost end of the truck frame forward of the storage compartment, the interconnection member extending through the storage compartment.

27. A mounting system for hauling a truck mounted beverage hauler at the rear of a trailer, the beverage handler being of the type having a pair of front wheels, a pair of front mounted fork tines, and a central rear wheel, the trailer of the type having a pair of rear wheels in a rear wheel area and a frame assembly extending forwardly from the rear wheel area, the trailer further having a generally vertical rear wall behind the rear wheel area, the mounting comprising:
   a support frame generally vertically disposed on the rear wall of the trailer and having a lower edge and an upper edge interconnected by a pair of side edges, the support panel having a forward face adjacent the rear wall of the trailer and an opposed rearward face;
   a pair of forklift wheel pockets configured to receive the front wheels of the beverage handler, the wheel pockets connected to the rearward face of the support panel
   a pair of forklift tine receiving tubes having forward ends disposed forwardly of the forward face of the support panel and open rearward ends for receiving the tines of the beverage handler, the receiving tubes being interconnected with the support frame;
   a pair of connection members having first ends connected to the support frame and second ends configured to interconnect with the beverage handler rearwardly of the front wheels so as to help support the weight of the beverage handler; and
   a pair of frame assembly connection brackets configured to interconnect the frame of the truck with the support frame such that the support frame is sufficiently strong to receive the beverage handler.

28. The mounting system according to claim 27, wherein the connection brackets have attachment flanges and the support frame includes complementary attachment flanges for mating with the brackets.

29. The mounting system according to claim 27, wherein the rear ends of the receiving tubes extend rearwardly from the rearward face of the support frame.

30. The mounting system according to claim 29, further comprising a reinforcing collar surrounding and supporting the rear ends of each of the receiving tubes, the collars being interconnected with the support frame.

31. A beverage hauling trailer with a beverage handler mount for hauling a beverage handler of the type having a body and a pair of fork tines movable with respect to the body and mounted generally to the front of the body, the handler further having a pair of front wheels supported on the front of the body, the trailer comprising:
   a pair of rear wheels disposed in a rear wheel area for supporting the trailer;
   a frame having a rearmost end in the rear wheel area, the frame extending forwardly from the rear wheel area;
   a rear wall adjacent the rear wheel area;
   a mounting system comprising;
      a support frame generally vertically disposed on the rear wall of the trailer and having a lower edge and an upper edge interconnected by a pair of side edges, the support panel having a forward face adjacent the rearwall of the trailer and an opposed rearward face;
      a pair of forklift wheel pockets configured to receive the front wheels of the beverage handler, the wheel pockets connected to the rearward face of the support panel.
      a pair of forklift tine receiving tubes having forward ends disposed forwardly of the forward face of the support panel and open rearward ends for receiving the tines of the beverage handler, the receiving tubes being interconnected with the support frame;

a pair of connection members having first ends connected to the support frame and second ends configured to interconnect with the beverage handler rearwardly of the front wheels so as to help support the weight of the beverage handler; and a pair of frame assembly connection brackets interconnecting the frame of the truck with the support frame such that the support frame is sufficiently strong to receive the beverage handler.

32. The trailer according to claim 31, wherein the receiving tubes extend into the rear of the trailer above the frame of the trailer.

33. The trailer according to claim 32, wherein the receiving tubes are attached to the frame of the trailer.

34. The trailer according to claim 31, wherein the first ends of the connection member are connected with the support frame adjacent the upper edge.

35. The trailer according to claim 34, further comprising a reinforcing collar surrounding and supporting the rear ends of each of the receiving tubes, the collars being interconnected with the support frame.

36. The trailer according to claim 31, wherein the rear ends of the receiving tubes extend rearwardly from the rearward face of the support frame.

* * * * *

UNITED STATES PATENT AND TRADEMARK OFFICE
CERTIFICATE OF CORRECTION

PATENT NO. : 6,572,322 B2
DATED : June 3, 2003
INVENTOR(S) : Harry Karr

It is certified that error appears in the above-identified patent and that said Letters Patent is hereby corrected as shown below:

Column 6,
Line 62, replace "14" with -- ¼ --.

Column 15,
Line 36, delete "a" (second occurrence).

Signed and Sealed this

Thirtieth Day of December, 2003

JAMES E. ROGAN
*Director of the United States Patent and Trademark Office*